(12) United States Patent  
Merrill, Jr. et al.

(10) Patent No.: US 9,291,638 B2  
(45) Date of Patent: Mar. 22, 2016

(54) SUBSTRATE CURVATURE COMPENSATION METHODS AND APPARATUS

(71) Applicant: mCube Inc., San Jose, CA (US)

(72) Inventors: Raymond Merrill, Jr., San Ramon, CA (US); Anthony Flannery, Jr., Los Gatos, CA (US); Shingo Yoneoka, San Jose, CA (US)

(73) Assignee: mCube, Inc., San Jose, CA (US)

( * ) Notice: Subject to any disclaimer, the term of this patent is extended or adjusted under 35 U.S.C. 154(b) by 421 days.

(21) Appl. No.: 13/745,723

(22) Filed: Jan. 18, 2013

(65) Prior Publication Data

US 2013/0186171 A1 Jul. 25, 2013

Related U.S. Application Data

(60) Provisional application No. 61/589,240, filed on Jan. 20, 2012.

(51) Int. Cl.
| | |
|---|---|
| *G01P 21/00* | (2006.01) |
| *G01P 15/125* | (2006.01) |
| *G01P 15/08* | (2006.01) |

(52) U.S. Cl.
CPC .............. *G01P 15/125* (2013.01); *G01P 15/08* (2013.01); *G01P 15/0802* (2013.01); *G01P 21/00* (2013.01); *G01P 2015/0831* (2013.01)

(58) Field of Classification Search
CPC ... G01P 15/125; G01P 21/00; G01P 15/0802; G01P 15/18; G01P 2015/0831
USPC ................. 73/1.38, 514.16, 514.32; 156/292; 216/20; 74/1.37, 514.32, 514.02
See application file for complete search history.

(56) References Cited

U.S. PATENT DOCUMENTS

| | | | | |
|---|---|---|---|---|
| 4,144,764 | A * | 3/1979 | Hartzell, Jr. ........... | G01R 17/02 318/615 |
| 4,345,474 | A * | 8/1982 | Deval ..................... | G01P 15/131 73/514.18 |
| 2005/0229705 | A1* | 10/2005 | Geen ..................... | G01C 19/574 73/514.16 |
| 2006/0201249 | A1* | 9/2006 | Horning ................ | H02N 1/008 73/504.14 |
| 2006/0277997 | A1* | 12/2006 | Foster .................... | G01P 15/18 73/514.32 |
| 2007/0119252 | A1* | 5/2007 | Adams ................ | G01P 15/0802 73/510 |
| 2009/0064782 | A1* | 3/2009 | Yazdi ................. | G01C 19/5684 73/504.13 |
| 2009/0116675 | A1* | 5/2009 | Miyoshi ................ | B81B 3/0072 381/369 |

(Continued)

*Primary Examiner* — Peter Macchiarolo
*Assistant Examiner* — Mohammed Keramet-Amircolai
(74) *Attorney, Agent, or Firm* — Kilpatrick Townsend & Stockton LLP

(57) ABSTRACT

A method for providing acceleration data with reduced substrate-displacement bias includes receiving in an accelerometer an external acceleration, determining the acceleration data with reduced substrate displacement bias in a compensation portion in response to a first and a second displacement indicators from a MEMS transducer, and, in response to substrate compensation factors from a MEMS compensation portion, outputting the acceleration data with reduced substrate displacement bias, wherein the first displacement indicator and the second displacement indicator are determined by the MEMS transducer relative to a substrate in response to the external acceleration and to a substrate displacement, and wherein the substrate compensation factors are determined by the MEMS compensation portion relative to the substrate in response to the substrate displacement.

20 Claims, 10 Drawing Sheets

(56) References Cited

U.S. PATENT DOCUMENTS

| | | | | |
|---|---|---|---|---|
| 2009/0293617 A1* | 12/2009 | McNeil | B81B 3/0072 | 73/514.32 |
| 2010/0007238 A1* | 1/2010 | Yang | H02N 1/004 | 310/300 |
| 2010/0139401 A1* | 6/2010 | Schwarzelbach | G01P 15/0802 | 73/514.32 |
| 2010/0242603 A1* | 9/2010 | Miller | B81B 7/02 | 73/514.32 |
| 2011/0067495 A1* | 3/2011 | Yu | G01P 15/0888 | 73/514.24 |
| 2011/0167891 A1* | 7/2011 | Geen | G01C 25/005 | 73/1.38 |
| 2011/0270569 A1* | 11/2011 | Stephanou | G01C 19/5712 | 702/141 |

* cited by examiner

SECTION AA

SECTION BB

FROM FIG. 1B

FROM FIG. 1E

FROM FIG. 1D

SECTION CC

Po = Psense orthogonal
No = Nsense orthogonal
Ps = Psense
Ns = Nsense

COMPENSATION
STRUCTURE

SUBSTRATE CURVATURE COMPENSATION METHODS AND APPARATUS

CROSS-REFERENCE TO RELATED APPLICATIONS

The present patent application claims priority to and is a non-provisional of application No. 61/589,240 filed Jan. 20, 2012. That application is incorporated herein by reference, for all purposes.

BACKGROUND OF THE INVENTION

The present invention relates to MEMS devices. More specifically, the present invention relates to MEMS devices having reduced mechanical or thermal bias.

Microelectromechanical systems (MEMS) include very small mechanical devices that are often lithographically etched upon a substrate. These mechanical devices typically include one or more capacitive and/or resistive elements. As the mechanical devices move, for example, the capacitances change, and the change in capacitances are manifested into one or more electrical signals.

The inventors have demonstrated that as fabrication technologies and capabilities increase, the sensitivity of such MEMS devices, e.g. accelerometers, gyroscopes, and the like, of such devices increases. One problem, however, is the effect of stiction forces upon smaller and smaller physical components. To address such forces, mechanical stops and limits are often integrated into the MEMS designs.

Another problem is the effect of physical stresses upon such MEMS devices or substrates of the MEMS devices. Examples of physical forces include expansion/contraction stress of the MEMS substrate or components of the MEMS device due to: temperature stresses of the MEMS device during operation, sometimes due to differences in coefficient of thermal expansion between the substrate and packaging material; mechanical stress from manufacturing machines (e.g. pick and place, wave soldering, socketing) of the MEMS device onto a circuit board; mechanical stress applied of the MEMS device after integration into a hand-held device; or the like. In some cases, such as temperature, these forces are dynamic, and can vary in time.

The inventors are aware of one set of solutions that are used to attempt to compensate for stresses applied to the MEMS device due to changes in temperature. In one solution, each MEMS device is manufactured with a temperature sensor. After packaging, each MEMS device is individually tested in physically controlled environments at a variety of different temperatures. The MEMS device output readings are monitored and then correlated to the temperatures sensed by the internal temperature sensor. Next, a series of calibration numbers for the output readings and associated operating temperature are determined and then stored on the specific MEMS device.

The inventors of the present invention can see numerous drawbacks to the approach above. One drawback includes that the designer of the MEMS device must disadvantageously reserve a certain amount of die area for temperature sensors and the like. Another drawback is that from a manufacturing standpoint, it is very time consuming and expensive to have to individually thermally cycle test each MEMS device and to individually program each MEMS device based upon the thermal cycle test data.

Yet another drawback is that these temperature calibration processes cannot compensate for other stresses that may be imparted to the MEMS device, such as: physical stresses due to integration or insertion of the MEMS device onto a PCB, socket, or the like; physical stresses applied to a device having the MEMS device (e.g. sitting upon a device, or the like); long term drift or biases of such MEMS devices (e.g. hysteresis); and the like. These and other types of stresses, that may or may not be dependent upon time and may affect the outputs of the MEMS devices, are not presently accounted for.

In light of the above, it is desired to have MEMS devices with reduced stress sensitivity without the drawbacks described above.

BRIEF SUMMARY OF THE INVENTION

The present invention relates to MEMS devices. More specifically, the present invention relates to MEMS devices having reduced mechanical or thermal stress or bias.

Various embodiments of the present invention include devices having MEMS based sensors in addition to MEMS based compensation structures. In some embodiments, the MEMS based compensation structures are physically located next to the MEMS sensors on a device or substrate. By being adjacent to the MEMS sensor, the compensation structures may sense the stresses or biases that are placed upon the MEMS sensor during production or operation of the device.

In some embodiments, a compensation structure may be T-shaped in geometry, with the base of the T being centered about an axis of rotation of the MEMS accelerometer. In some embodiments, structures are located on or near the ends of the T-shaped structure as well as the underlying substrate. These structures together form capacitive elements which can be sensed by the device.

With no substrate bias or stress, the capacitive elements on or near the ends of the compensation structure may be the same or at a fixed ratio. However, when the substrate is biased or under stress, the capacitive elements on or near the ends of the compensation structure may become different or may vary from the fixed ratio. The relationship between the no bias or stress capacitances, and the capacitances of the under stress conditions are then used to compensate readings from the MEMS accelerometer.

According to one aspect of the invention, a method for providing acceleration data, with reduced substrate-displacement bias, from an accelerometer comprising a substrate, a MEMS transducer, a MEMS compensation portion, and a compensation portion, wherein the substrate is subject to a substrate displacement, is described. A technique may include receiving in the accelerometer an external acceleration, and determining the acceleration data with reduced substrate displacement bias in the compensation portion in response to a first displacement indicator and a second displacement indicator from the MEMS transducer and in response to substrate compensation factors from the MEMS compensation portion. A process may include outputting the acceleration data with reduced substrate displacement bias from the compensation portion. In some embodiments, the first displacement indicator and the second displacement indicator are determined by the MEMS transducer relative to the substrate in response to the external acceleration and to the substrate displacement. In some embodiments, the substrate compensation factors are determined by the MEMS compensation portion relative to the substrate in response to the substrate displacement.

According to another aspect of the invention, an accelerometer disposed upon a substrate for outputting acceleration data with reduced substrate-displacement bias is described. One device includes a calibration sensor coupled to the substrate, wherein a substrate calibration displacement is determinable between the calibration sensor relative to the substrate in response to a substrate displacement. An apparatus may include a MEMS transducer coupled to the substrate, wherein a first displacement and a second displacement are determinable between the MEMS transducer relative to the substrate in response to the substrate displacement and to an external acceleration. An accelerometer may include a compensation portion coupled to the substrate, to the calibration sensor, and to the MEMS transducer, wherein the compensation portion is configured to determine acceleration data with reduced substrate-displacement bias in response to the substrate calibration displacement, to the first displacement, and to the second displacement, and configured to output the acceleration data with reduced substrate displacement bias.

According to yet another aspect of the invention, a method for forming a MEMS accelerometer is disclosed. One process may include forming a first electrode, a second electrode, a third electrode and a fourth electrode upon a first substrate, and forming a MEMS transducer upon a second substrate, wherein the MEMS transducer comprises a fifth electrode and a sixth electrode. A method may include forming a substrate displacement portion upon the second substrate, wherein the substrate displacement portion comprises a seventh electrode and an eighth electrode, wherein an axis of rotation of the MEMS transducer is substantially similar to an axis of rotation of the substrate displacement sensor, and bonding the first substrate to the second substrate, wherein a first capacitor is formed between the first electrode and the fifth electrode, wherein a second capacitor is formed between the second electrode and the sixth electrode, wherein a third capacitor is formed between the third electrode and the seventh electrode, and wherein a fourth capacitor is formed between the fourth electrode and the seventh electrode. A fabrication recipe may include forming a compensation circuit upon the substrate, wherein the compensation circuit is coupled to the first capacitor, the second capacitor, the third capacitor, and the fourth capacitor.

BRIEF DESCRIPTION OF THE DRAWINGS

In order to more fully understand the present invention, reference is made to the accompanying drawings. Understanding that these drawings are not to be considered limitations in the scope of the invention, the presently described embodiments and the presently understood best mode of the invention are described with additional detail through use of the accompanying drawings in which.

DETAILED DESCRIPTION OF THE INVENTION

Figure 1A:
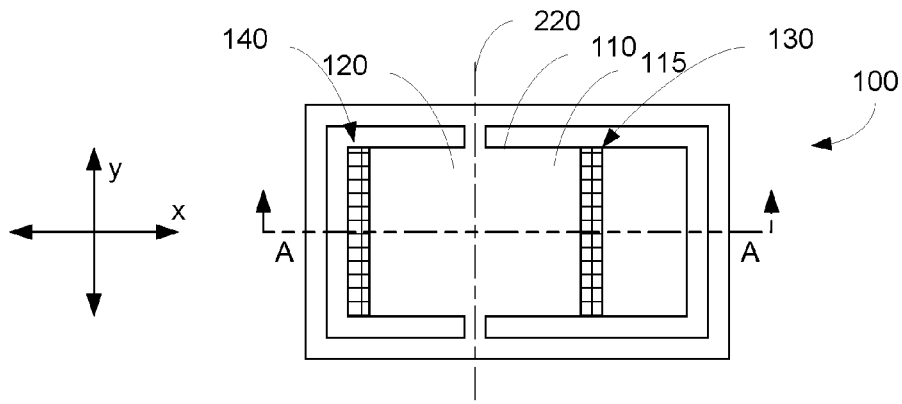
FIGS. 1A-D illustrate issues considered by the inventors of the present invention.

FIG. 1A-D illustrates issues addressed by embodiments of the present invention. In current accelerometer designs under development by the assignee of the present invention, a MEMS accelerometer 100 is based upon a MEMS transducer 110. In the illustrated embodiment, the MEMS transducer may measure acceleration in a z-direction. In other embodiments, the MEMS transducer may be configured to measure acceleration in other directions.

In FIGS. 1A-D, it can be seen that MEMS transducer 110 is based upon an asymmetrically weighted design including a longer portion 115 and a shorter portion 120 that flex/rotate about an axis 220. As illustrated in a side-view, one or more capacitors 130 are formed between the substrate 150 and the ends of longer portion 115, and one or more capacitors 140 are formed between substrate 150 and the ends of shorter portion 120. In normal operation, MEMS transducer 110 rotates or flexes about axis 220, similar to a see-saw, when MEMS transducer 110 is subject to different forces or acceleration (e.g. in the z-direction). At the same time, the capacitances of capacitors 130 and capacitors 140 are determined or sensed. These capacitor values are then typically used to determine the orientation of MEMS transducer 110, and the forces being applied to the MEMS accelerometer.

Figure 1B:
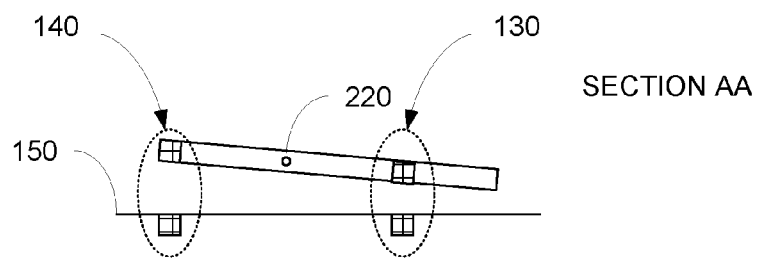

FIG. 1B illustrates a first type of substrate displacement addressed by embodiments of the present invention. In this example, the accelerometer is at rest, but substrate 160 is bowed or flexed upwards as a result of thermal stresses, mechanical stresses, or the like. Further, the axis of curvature, if any, is not aligned to axis 220. As a result, as can be seen, the capacitance sensed by capacitors 170 will be smaller than capacitance 130 in FIG. 1A, and the capacitance sensed by capacitors 180 will be larger than capacitance 140 in FIG. 1A. This substrate displacement (and changes in sensed capacitances) may be misinterpreted as acceleration, as illustrated in FIG. 1C.

Figure 1C:
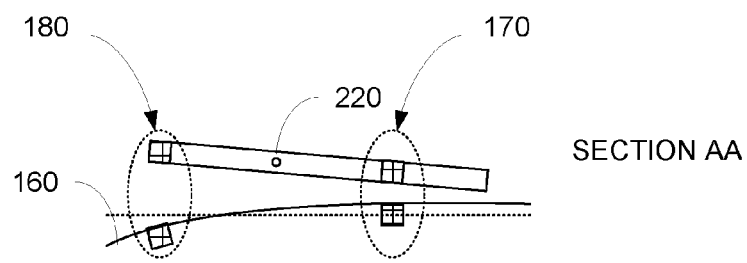

FIG. 1C illustrates an example of MEMS transducer 230 being subject to an upward acceleration. This situation is similar to the situation sensed in the example illustrated in FIG. 1B. In FIG. 1C, as MEMS transducer 230 is accelerated upwards, the more massive portion 240 will move down towards substrate 280, and the less massive portion 250 will move away from substrate 280. As a result, the capacitance sensed by capacitors 260 will be smaller than capacitance 130 in FIG. 1A, and the capacitance sensed by capacitors 270 will be larger than capacitance 140 in FIG. 1A. This situation is similar to the changes in capacitances shown in FIG. 1B. In light of the above, even if substrate 160 is at rest (FIG. 1B), the accelerometer may indicate an acceleration in a vertical direction (FIG. 1C).

Figure 1D:
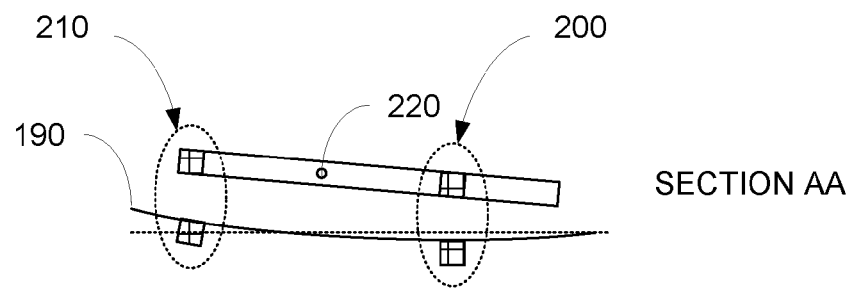

A similar problem may occur if the substrate 190 is bowed or flexed upwards as illustrated in FIG. 1D, as a result of thermal stress, mechanical stresses, or the like. For example, the changes in capacitances sensed from capacitors 200 versus capacitors 210, because of the substrate 190 bending, may be similar to changes in capacitances because of acceleration imparted upon the device (e.g. in an downwards direction, or the like). Accordingly, one of the problems is that the accelerometer may erroneously report an acceleration, even though the accelerometer may actually be at rest.

FIG. 2A-D illustrate configurations of accelerometers according to various embodiments of the present invention. More specifically, a top and a side view of an accelerometer 300 are illustrated. Similar to the configuration for a MEMS transducer developed by the assignee of the present patent application, accelerometer 300 includes an asymmetrically weighted MEMS transducer 310, having a longer portion 315 and a shorter portion 320. Additionally, longer portion 315 is associated with capacitors 330 with respect to substrate 365, and shorter portion 320 is associated with capacitors 340 with respect to substrate 365. The MEMS transducer 310 flexes/rotates about an axis of rotation 360.

In various embodiments, one or more additional MEMS structures 350 and 380 may be formed upon substrate 365. In various embodiments, MEMS structures 350 and 380 are secured to substrate 365 at a point coincident with the axis of rotation 360. As can be seen in the side view, MEMS structure 350 includes equal length arms, and each arm is associated with a capacitive structure 470 and 480, respectively, with respect to substrate 365. In various embodiments, it is desired that the axis of rotation is approximately centered upon the semiconductor substrate typically to the accuracy of +/−50 microns.

In operation, when substrate 365 is not subject to any temperature or mechanical stresses, it is expected that the capacitances of capacitors 470 will be constant relative to capacitors 480. In one example, the capacitances may be the same, and in another example, the capacitances may not be the same, but should be relatively constant while the substrate is not curved or bowed. In various embodiments, while the ratio of the capacitances are measured to be similar, or the same, the capacitances measured by the MEMS transducer 310 may not be modified. In other words, while no substrate displacement is sensed, the changes in capacitances of the MEMS transducer 310 should reflect acceleration forces upon the accelerometer 300. In contrast, the acceleration forces should change when the relative capacitances of MEMS structure 350 changes. In various embodiments, typical displacements for MEMS transducer 310 may be approximately 1 nm. Without substrate flex, in various embodiments, such a displacement is associated with an acceleration of approximately 250 mG or 4 nm for 1 G.

Figure 2A:
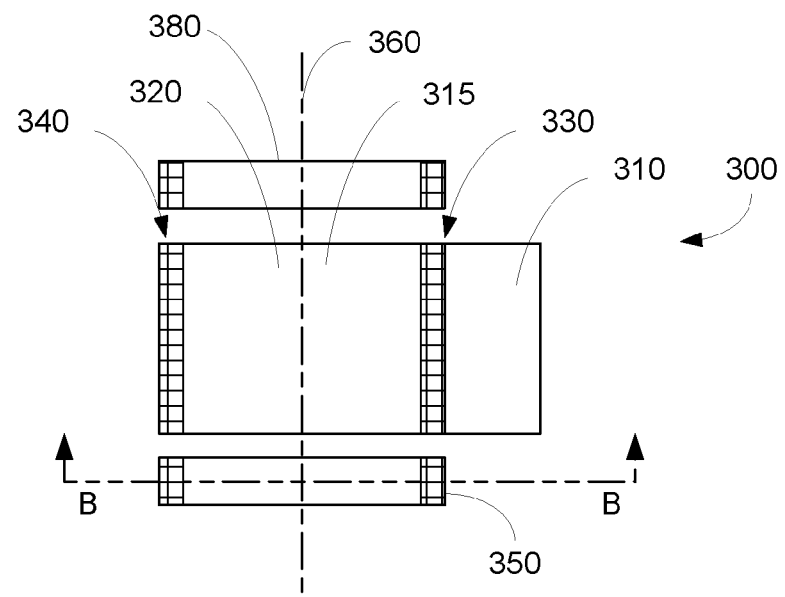
FIGS. 2A-D illustrate embodiments of the present invention.
Figure 2A:
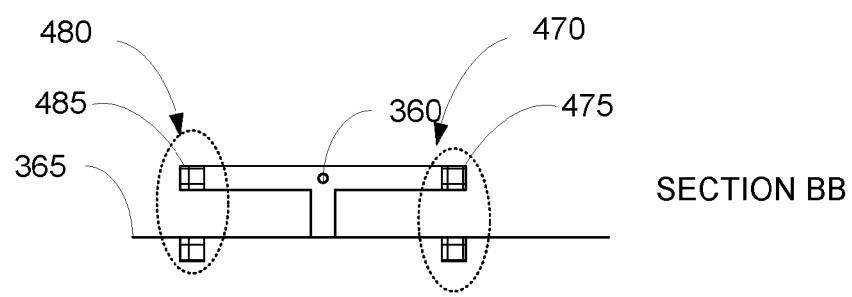
Figure 2B:
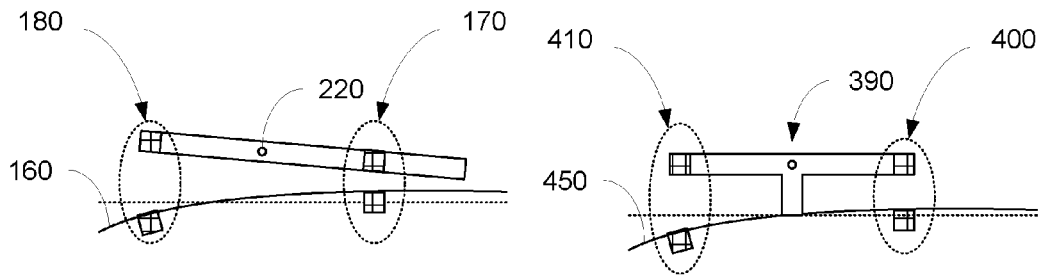

FIG. 2B illustrates a side view of one embodiment of the present invention. More particularly, FIG. 2B illustrates MEMS structure 390, similar to MEMS structure 350 in FIG. 2A, upon a substrate 450. In FIG. 2B, substrate 450 of the accelerometer is subject to a warping or displacement, similar to that illustrated in FIG. 1B, i.e. bowed downwards. Under this condition, as can be seen, capacitances of capacitors 400 and 410 will change relative to the configuration illustrated in FIG. 2A. In this example, the capacitances of capacitors 400 and 170 decreases, and the capacitances of capacitors 410 and 180 increases. In various embodiments, the change in capacitance (from capacitors 400 and 410) associated with MEMS structure 390 is used to determine one or more substrate compensation factors.

Figure 2C:
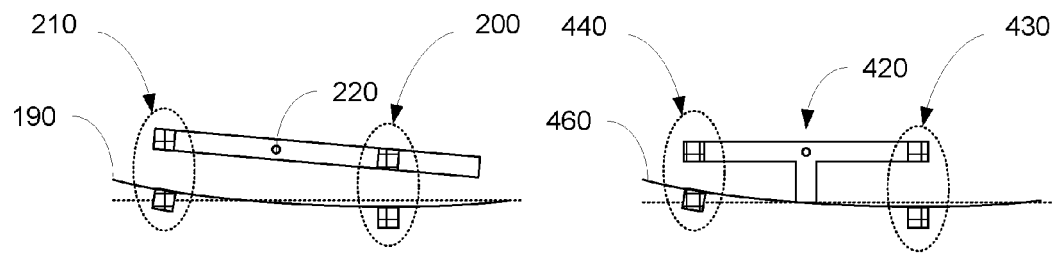

FIG. 2C illustrates a side view of one embodiment of the present invention. More particularly, FIG. 2C illustrates MEMS structure 420, similar to MEMS structure 350 in FIG. 2A, upon a substrate 460. In FIG. 2C, substrate 460 of the accelerometer is subject to a warping or displacement, similar to that illustrated in FIG. 1C, i.e. bowed upwards. Under this condition, as can be seen, capacitances of capacitors 430 and 440 will change relative to the configuration illustrated in FIG. 2A. In this example, the capacitances of capacitors 430 and 200 decreases by a first amount, and the capacitances of capacitors 440 and 210 decreases by a second amount. In various embodiments, the change (amount of decrease) in capacitance (from capacitors 430 and 440) associated with MEMS structure 420 is used to determine one or more substrate compensation factors.

Figure 2D:
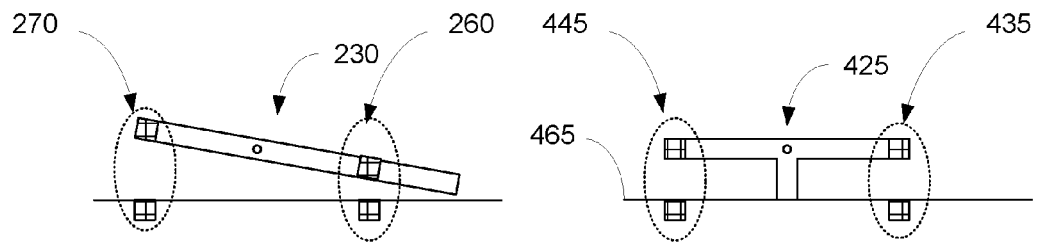

FIG. 2D illustrates a side view of one embodiment of the present invention. More particularly, FIG. 2D illustrates MEMS structure 425, similar to MEMS structure 350 in FIG. 2A, upon a substrate 465. In FIG. 2D, substrate 465 of the accelerometer is not subject to a warping or displacement. Under this condition, as can be seen, capacitances of capacitors 435 and 445 will not change relative to the configuration illustrated in FIG. 2A. Accordingly, in various embodiments, changes in capacitances 260 and 270 for transducer 230 may reflect the acceleration imparted upon the device.

The embodiments illustrated above are directed towards determining z displacement in a single direction, either the x or y direction, depending upon nomenclature. In various embodiments, the direction need not be parallel to the edge of the substrate or MEMS transducer. For example, the direction may be 45 degrees from the MEMS transducer edge.

In various embodiments, the MEMS transducer is capable of determining z-axis acceleration up to approximately 10 bits of sensitivity (e.g. 0.7 fF/250 fF).

Figure 3:
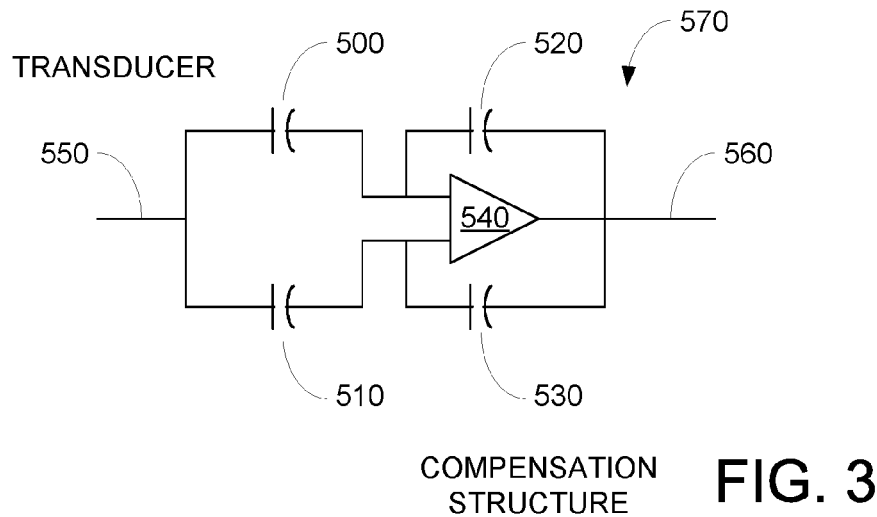
FIG. 3 illustrates embodiments of the present invention.

FIG. 3 illustrates a conceptual block diagram of a circuit 570 according to some embodiments of the present invention. More specifically, FIG. 3 includes a capacitors 500 and 510 (and optionally 520 and 530), and differential amplifier 540. A signal 550 is provided as an input signal, and a signal 560 is provided as an output signal. In some embodiments, signal 550 may be a square wave having a 50% duty cycle, or the like. In some embodiments, signal 550 may have an initial amplitude. In some embodiments, output signal 560 may be input into a digital to analog converter, or the like.

In one example, capacitors 500 and 510 correspond to the capacitances (e.g. 330 and 340 in FIG. 2A) associated with the MEMS transducer (e.g. 310), and circuit 570 is used to determine an amount of z-direction deflection. In some embodiments, capacitors 500 and 510 may correspond to the capacitances (e.g. 475 and 485 in FIG. 2A) associated with the MEMS compensation structure (e.g. 350, 380). In some embodiments of a device, one circuit 570 is provided for capacitances 330 and 340, and another circuit 570 is provided for capacitances 475 and 485 within a single device described herein. In various embodiments, capacitors 520 and 530 may or may not be provided and correspond to trim or adjustment capacitances.

In one example, as MEMS transducer 300 moves in response to a vertical acceleration, the values of capacitors 500 and 510 vary. In response, in some embodiments, the duty cycle of input signal 550 having a duty cycle (e.g. 50%) is changed; and in some other embodiments, the amplitude of the input signal 550 is varied in output signal 560. In some embodiments, the change of duty cycle, amplitude, or the like, is then converted into a digital value.

In one example, in one circuit 570 where capacitors 510 and 510 correspond to the z-deflection capacitances 330 and 340, in response to a purely z-deflection an input signal 550 may have a change, e.g. amplitude from 1 volt to 0.9 volt, duty cycle from 50% to 56%, or the like. In another circuit 570 on the same device, where capacitors 510 and 510 correspond to the MEMS compensation capacitances 475 and 485, in response to the same purely z-deflection an input signal 550 will not have a substantial change. As the outputs from these two circuits 570 are subtracted or compared (e.g. 0.1 volt−0 volt=0.1 volt acceleration difference) in the analog domain or the digital domain In another example, in one circuit 570 where capacitors 510 and 510 correspond to the z-deflection capacitances 330 and 340, in response to only the substrate bending, an input signal 550 may have a change, e.g. amplitude from 1 volt to 0.9 volt, duty cycle from 50% to 56%, or the like. In another circuit 570 on the same device, where capacitors 510 and 510 correspond to the MEMS compensation capacitances 475 and 485, in response to only the same substrate bending, an input signal 550 may have a change, e.g. amplitude from 1 volt to 0.9 volt, duty cycle from 50% to 56%, or the like. As the outputs from these two circuits 570 are subtracted or compared (e.g. 0.1 volt−0.1 volt=0 volt acceleration difference) in the analog domain or the digital domain, the net z-direction acceleration detected may be substantially zero.

In yet another example, in one circuit 570 where capacitors 510 and 510 correspond to the z-deflection capacitances 330 and 340, in response to only substrate bending and a z-acceleration, an input signal 550 may have a change, e.g. amplitude from 1 volt to 0.8 volt, duty cycle from 50% to 60%, or the like. In another circuit 570 on the same device, where capacitors 510 and 510 correspond to the MEMS compensation capacitances 475 and 485, in response to only the same substrate bending and z-acceleration, an input signal 550 may have a change, e.g. amplitude from 1 volt to 0.9 volt, duty cycle from 50% to 54%, or the like. As the outputs from these two circuits 570 are subtracted or compared (e.g. 0.2 volts−0.1 volt=0.1 volt acceleration voltage) in the analog domain or the digital domain.

As discussed above, in various embodiments, this type of compensation can be performed in the analog domain via analogy circuitry, or in the digital domain via digital circuitry, or partially in the digital domain and partially in the analog domain.

Figure 4:
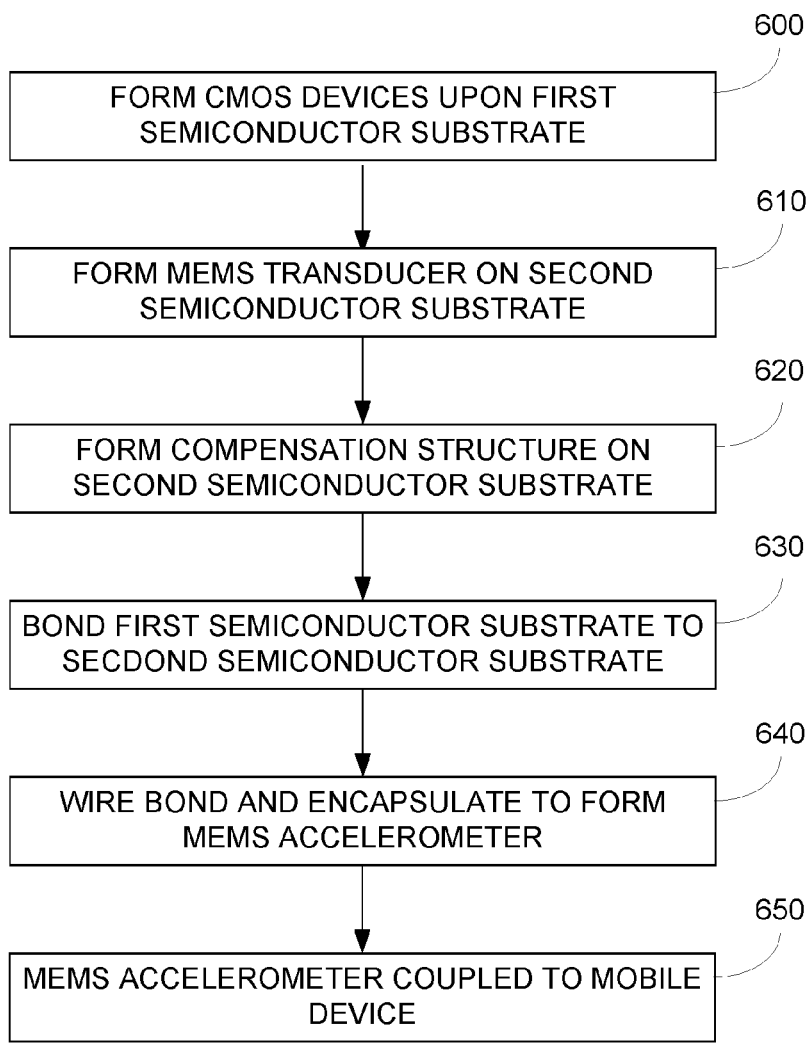
FIG. 4 illustrates a block diagram of a process for fabrication embodiments of the present invention.

FIG. 4 illustrates a block diagram of a process according to various embodiments of the present invention. More specifically, FIG. 4 illustrates a process for manufacturing an accelerometer and for operating the accelerometer to compensate for substrate deformations, displacement, or the like. Embodiments of the present invention can be operated without resorting to temperature pre-characterization of the accelerometer, however, other embodiments may include temperature-related compensation data.

In various embodiments, one or more CMOS devices may be fabricated upon a first semiconductor substrate, e.g. silicon, or the like, step 600. In some embodiments, the CMOS devices may incorporate processing circuits, storage memories, MEMS support circuits (e.g. MEMS drivers, and the like. In one example, driver circuitry associated with the MEMS compensation determination structure, described herein, is formed.

In some embodiments of the present invention, the MEMS devices described herein are fabricated upon a second semiconductor substrate and then bonded to the first semiconductor substrate. In other embodiments, the MEMS transducer, and the like are then formed on top of the CMOS devices described above with an interposed insulating layer. In still other embodiments, the MEMS transducer, and the like are formed laterally adjacent to the CMOS devices on the first semiconductor substrate. In still other embodiments, the MEMS devices may be formed partially on top of the CMOS devices.

Referring the configuration of an accelerometer 300 described in FIG. 2A, above, in one embodiment, the MEMS transducer is formed upon a second substrate, step 610. In various embodiments, conventional MEMS fabrication techniques including undercutting may be used to form an asymmetrically weighted MEMS transducer. In various embodiments, the portion of the MEMS transducer includes electrodes that form a portion of the sense capacitors. As illustrated above, this MEMS transducer is configured to pivot or rotate along a defined axis. In various embodiments, it is envisioned that any other MEMS device that can be improperly influenced by deformation of the underlying substrate may be fabricated in the present step.

In various embodiments, during the above process, a MEMS compensation determination structure (e.g. 390, 420) may also be fabricated upon the second substrate, step 620. In other embodiments, the MEMS compensation structure may be fabricated in separate steps from the MEMS transducer fabrication steps. In various embodiments, the portions of the MMES compensation determination structure include electrodes that form a portion of the sense capacitors, as discussed above. In some examples, the MEMS compensation determination structure may be defined to pivot along the defined axis.

In some embodiments, the MEMS compensation determination structure may be adjacent to the MEMS transducer, or the like. In some embodiments, more than one compensation determination structure may be fabricated. In one example, two MEMS determination structures are formed, one for each side of the MEMS transducer. In another example, four MEMS determination structures are formed surrounding the MEMS transducer.

In various embodiments, the first substrate is then physically bonded to the second substrate, step 630. In some embodiments, this process may include forming a cavity above the CMOS devices wherein the MEMS devices operate. In such embodiments, the second substrate is flipped upside down before bonding it to the first substrate.

The device including the MEMS transducer and MEMS compensation determination structure may be electrically coupled to the CMOS devices and packaged/protected with an epoxy or other encapsulant material, step 630. In some embodiments, flip-chip type connections may be used to provide electrical connections, and in other embodiments, a wire bonding process may be used to provide the electrical connections.

Subsequently, the packaged MEMS accelerometer may be surface mounted onto a circuit board of a mobile device, or the like, step 650. In some embodiments of the present invention, the MEMS transducer can be electronically calibrated after being incorporated into a mobile device, or the like. Accordingly, stresses due to the manufacturing process can be compensated.

Figure 5:
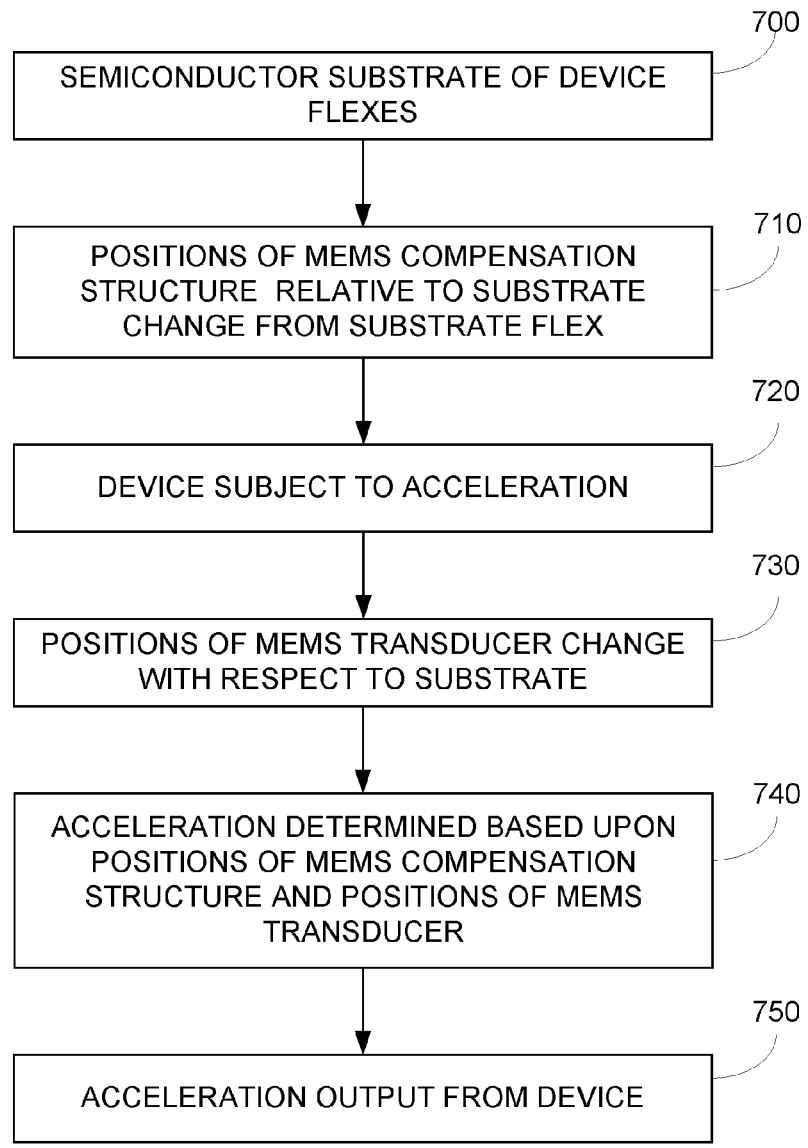
FIG. 5 illustrates a block diagram of a process for operating embodiments of the present invention.

FIG. 5 illustrates a block diagram of a process according to various embodiments of the present invention. More specifically, FIG. 5 illustrates a process for operating an accelerometer according to various embodiments to compensate for substrate deformations, displacement, or the like.

Initially, as a silicon substrate of the accelerometer bends or flexes, step 700, one portion of the MEMS compensation structure moves a first amount with respect to the silicon substrate, and another portion of the MEMS compensation structure moves a second amount with respect to the silicon substrate, step 710; and one portion of the MEMS transducer moves a first amount with respect to the silicon substrate, and another portion of the MEMS transducer moves a second amount with respect to the silicon substrate, step 710. As discussed above, in various embodiments, portions of the MEMS compensation determination structures move closer or further away from the substrate, a first capacitance associated with the one portion, and a second capacitance associated with the other portion are varied.

At the same time, a proof-mass of the accelerometer may or may not also be subject to an acceleration force in at least one direction, step 720. As the accelerometer is subject to the acceleration, one portion of the proof-mass moves a third amount with respect to the silicon substrate, and another portion of the proof-mass moves a fourth amount with respect to the silicon substrate, step 730. As discussed above, as the end portions of the proof mass move closer or further away from the substrate, a third capacitance associated with the one portion, and a fourth capacitance associated with the other portion are varied.

Next, according to the approximately simultaneous values for the first capacitance, the second capacitance, the third capacitance, and the fourth capacitance, the contribution of the silicon substrate bending or flexing is reduced from the sensed acceleration (associated with the third capacitance and fourth capacitance) to determine a compensated acceleration, step 740.

In various embodiments, the compensated acceleration is provided as output from the MEMS accelerometer, step 750.

Figure 6A:
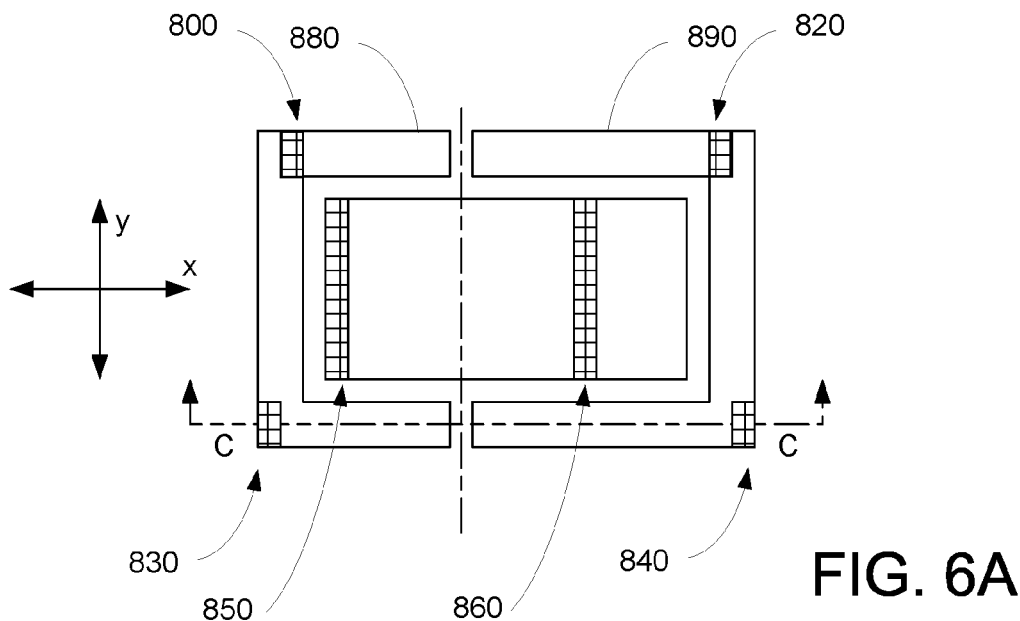
FIGS. 6A-B illustrate additional embodiments of the present invention.
Figure 6B:
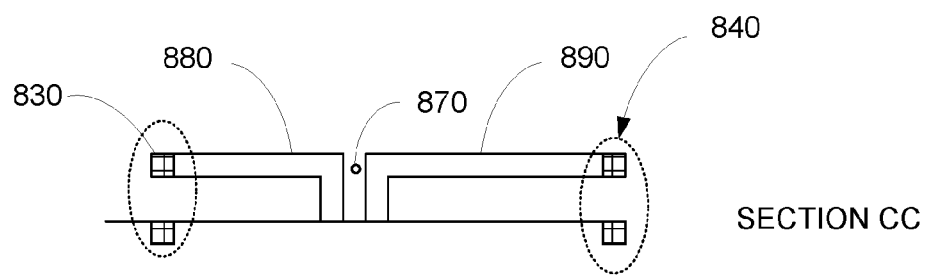

FIGS. 6A-B illustrate additional embodiments of the present invention where the MEMS compensation structures 880 and 890 are U shaped from an overhead view, FIG. 6A and are separated when viewed in cross-section, FIG. 6B. Such embodiments are directed towards determining and compensating for z displacement in two orthogonal directions, e.g. the x and y directions. As illustrated a number of capacitors 800, 820, 830 and 840 are formed on MEMS compensation structure 880 and 890.

In operation, as described in the examples above, capacitors 830 and 840, or 800 and 820 are used to determine compensation data for substrate z-displacement, e.g. bending in the x direction. Additionally, for example, capacitors 800 and 830 or capacitors 820 and 840 are used to determine compensation data for substrate z-displacement, e.g. bending in the y direction. In other embodiments, capacitors 800, 820, 830 and 840 may all be used to compensate for the substrate twisting in addition to bending in the x and y directions.

Figure 7:
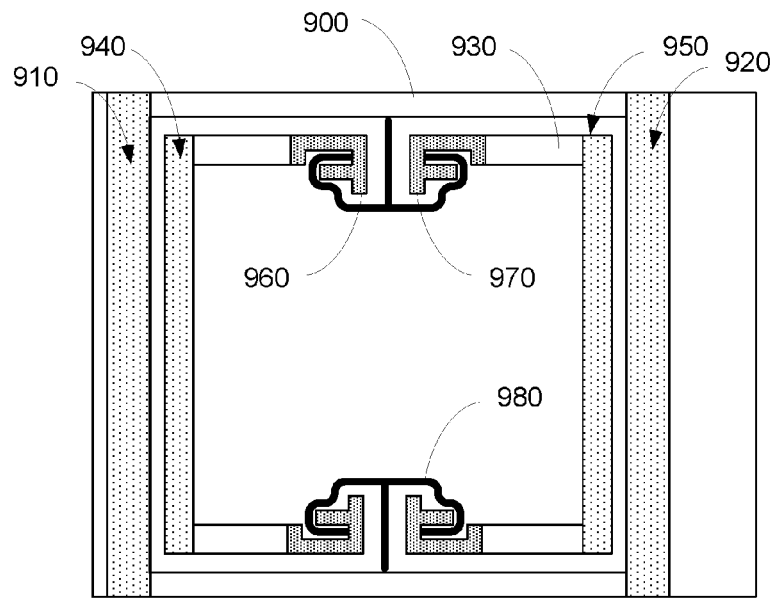
FIG. 7 illustrates additional embodiments of the present invention.

FIG. 7 illustrates an additional embodiment of the present invention for compensating for z-axis acceleration artifacts due to substrate bend or flex. In particular, a MEMS transducer 900 is shown outside a MEMS compensation structure 930. In various embodiments, one or more anchor points 960 and 970 are illustrated that anchor MEMS transducer 900 and MEMS compensation structure 930 to an underlying substrate. In FIG. 7, MEMS transducer 900 is coupled to anchor points 990 via one or more torsion springs 980. In various embodiments, MEMS transducer 900 flexes with respect to the substrate about an axis of torsion springs 980, similar to the embodiment illustrated in FIGS. 6A-B.

In various embodiments, MEMS transducer 900 includes a negative sense electrode region 910 and a positive sense electrode region 920 that are used to form one or more sense capacitors between MEMS transducer 900 and the substrate. Additionally, MEMS compensation structure 930 includes a negative sense electrode region 940 and a positive sense electrode region 950 that are used to form one or more sense capacitors between MEMS compensation structure 930 and the substrate.

Figure 8A:
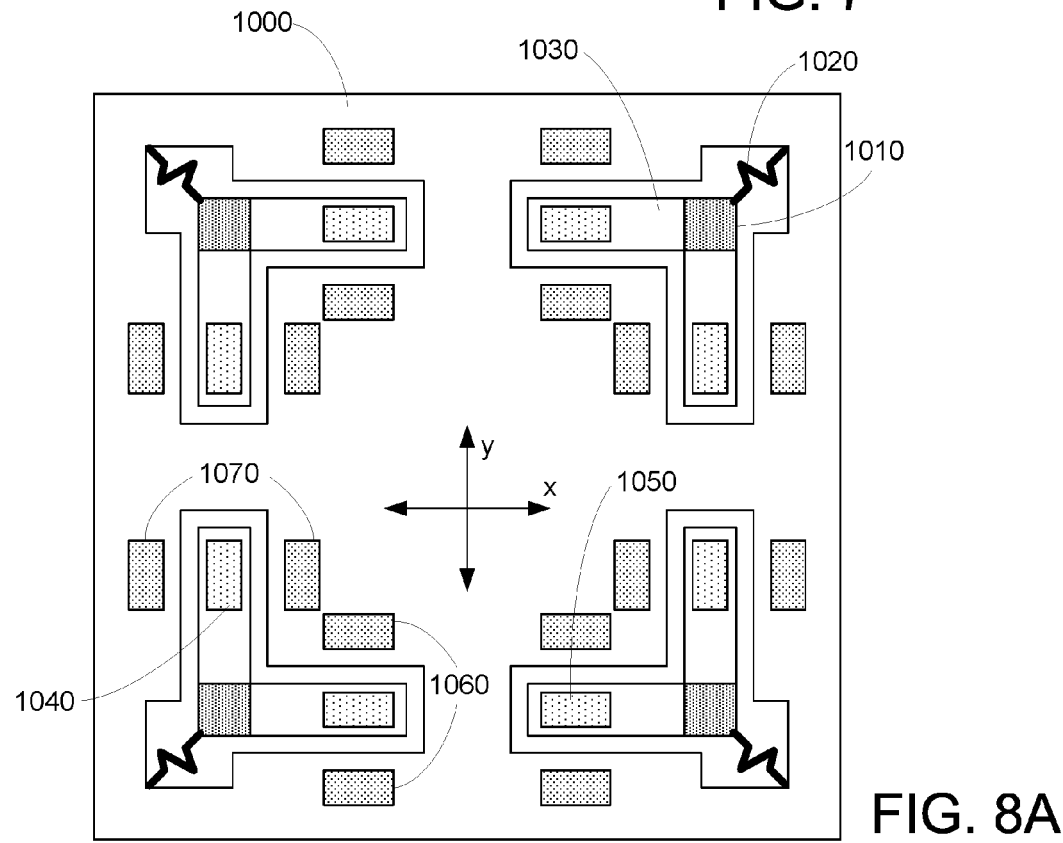
FIGS. 8A-E illustrate additional embodiments of the present invention.

FIGS. 8A-D illustrate additional embodiments of the present invention for compensating for x and/or y-axis acceleration artifacts due to substrate bend or flex. In particular, a MEMS transducer 1000 is shown surrounding multiple MEMS compensation structure 1030. In various embodiments, one or more anchor points 1010 are illustrated that anchor MEMS transducer 1000 and MEMS compensation structure 1030 to an underlying substrate. In FIG. 8A, MEMS transducer 1000 is coupled to anchor points 1010 via one or more springs 1020.

In various embodiments, MEMS transducer 1000 includes sense electrodes/structures 1060 and 1070 that are used to form one or more positive and negative sense capacitors between MEMS transducer 1000 and the substrate. In various embodiments, sense electrodes 1060 and 1070 may include plate-type capacitors arranged in a planar or interdigitated structure. Additionally, MEMS compensation structures 1030 includes sense electrodes/structures 1040 and 1050 that are used to form one or more sense capacitors between MEMS compensation structure 1040 and the substrate. In various embodiments, sense electrodes/structures 1040 and 1050 may include plate-type capacitors arranged in a planar or interdigitated structure. In operation, the sensed capacitances from each of the respective electrodes/structures depend upon the distance between plate capacitors or overlap of fingers of the interdigitated structures. In various embodiments, in response to a lateral acceleration and/or a substrate displacement, the distances between the plates or overlap of the respective fingers of the structures typically vary, thus the respective capacitances vary.

FIG. 8A illustrates an arrangement where acceleration sense electrodes (e.g. lateral acceleration capacitors) 1070 are separated by a substrate compensation sense electrode/structure 1040. In other embodiments, substrate compensation sense electrode/structures are separated by a lateral acceleration electrode/structure, as illustrated in FIG. 8B.

Figure 8B:
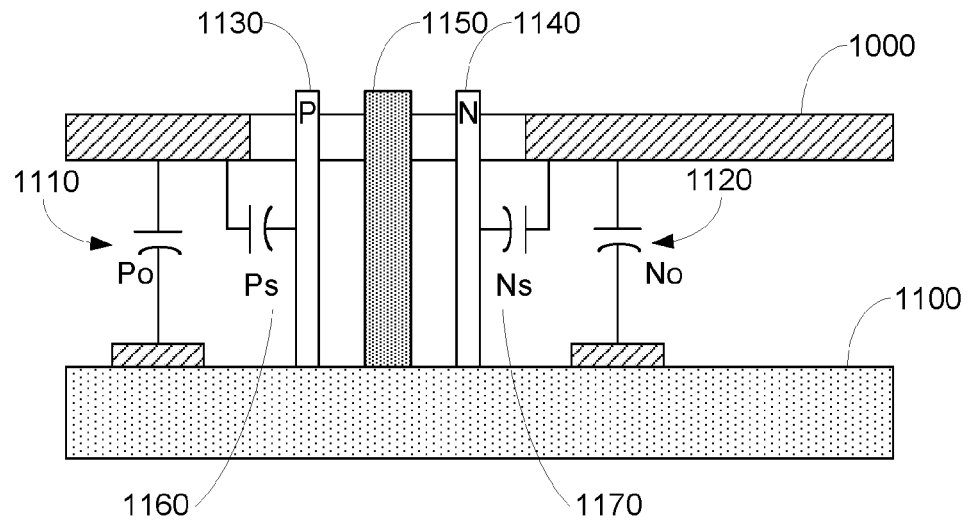

FIG. 8B illustrates a partial cross-section view of one embodiment of the present invention. Illustrated in FIG. 8B are MEMS transducer 1000 and a substrate 1100, and simplified representations of positive capacitor 1110 and negative capacitor 1120 formed across MEMS transducer 1000 and substrate 1100. In various embodiments, the capacitors 1110 and 1120 are used to determine substrate displacement compensations. In various embodiments, positive capacitor 1110 and negative capacitor 1130 include planar electrodes or interdigitated plates extending down from MEMS transducer 1000 and up from substrate 1100, or the like.

In FIG. 8B, an embodiment of a lateral acceleration sensor including a positive sense electrode 1130, a negative sense electrode 1140, and a capacitive shield 1150 (optional). As shown, positive sense electrode 1130 is associated with a positive lateral acceleration capacitance 1160 and negative sense electrode 1140 is associated with a negative lateral acceleration capacitance 1170.

Figure 8C:
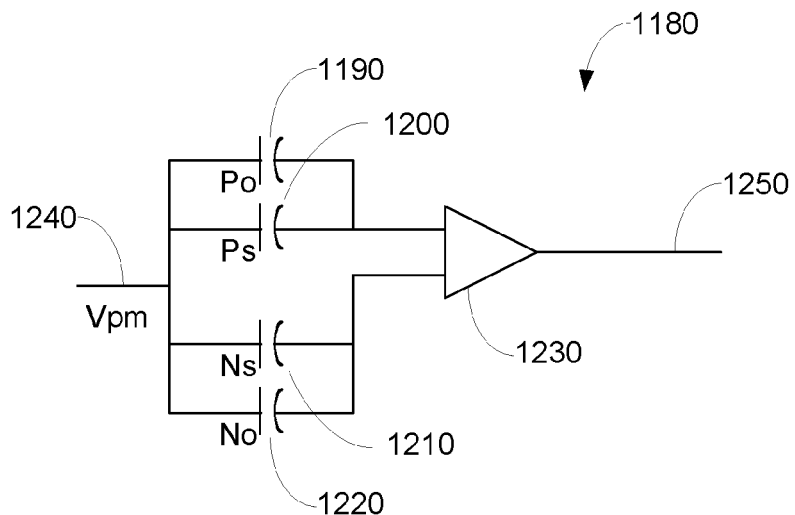

FIG. 8C illustrates a conceptual block diagram of a circuit 1180 according to some embodiments of the present invention. More specifically, FIG. 8C includes a capacitors 1190, 1200, 1210, and 1220, and amplifier 1230. A signal 1240 is provided as an input signal, and a signal 1250 is provided as an output signal. In some embodiments, signal 1250 may be a square wave having a 50% duty cycle, or the like, that is varied as a result of the circuit. In other embodiments, circuit 1180 is used to vary an amplitude of input signal 1240 to become an output signal 1250, depending upon specific embodiment.

In other embodiments, an amount of lateral acceleration may be determined in response to a separately sensed lateral acceleration from a sensed substrate displacement. As discussed in conjunction with FIG. 3, multiple circuits similar to circuit 1180 may be used to separately sense acceleration and substrate displacement. Further, the difference or adjustment computation between these values may be performed in the analog domain or in the digital domain, depending upon specific design.

In one example, capacitors 1190 and 1220 correspond to the capacitances 1110 and 1120 in FIG. 8B associated with a substrate compensation functionality of the MEMS transducer 1000 and capacitors 1200 and 1210 correspond to the capacitances 1160 and 1170 in FIG. 8B associated with the lateral acceleration sense capacitors.

Figure 8D:
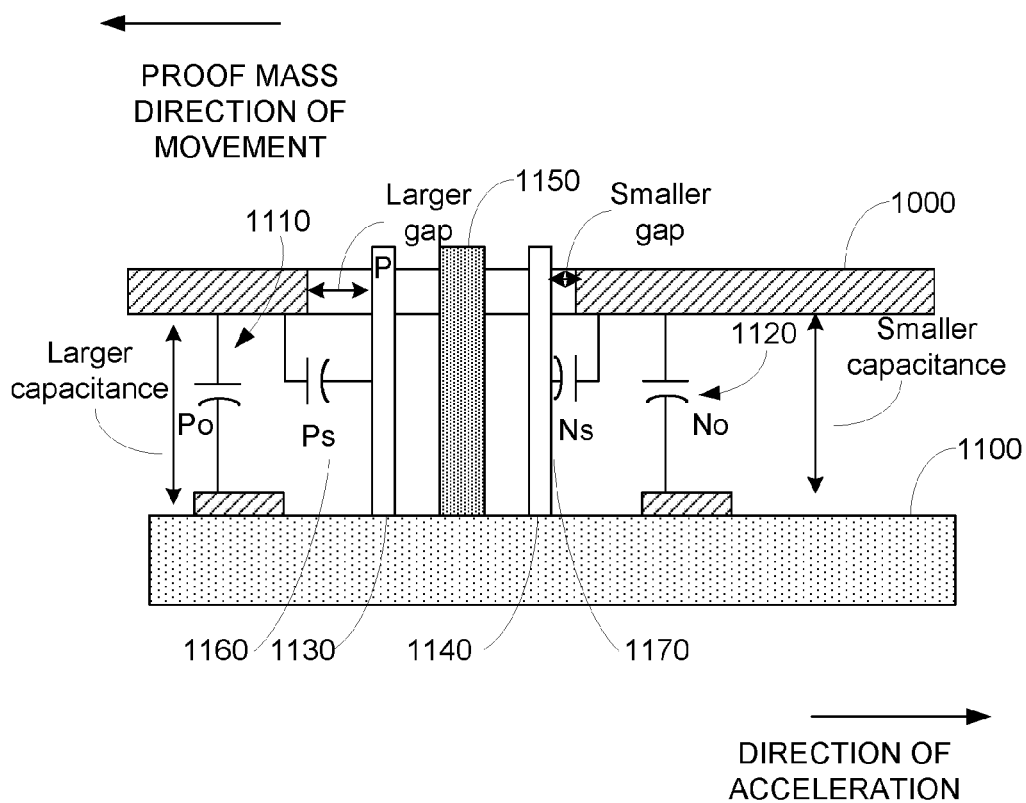

In one example, as illustrated in FIG. 8D, as MEMS transducer 1000 moves in response to a lateral acceleration (e.g. in the x-direction), the values of capacitors 1110 and 1120 vary. Additionally, the values of capacitors 1160 and 1170 also vary. In response, in some examples, the duty cycle or amplitude of input signal 1240 having a duty cycle (e.g. 50%, 1 volt) is affected. As a result, output signal 1250 will have a duty cycle (e.g. 48%) or amplitude (e.g. 0.9 volt) that changes. The change in duty cycle and/or amplitude is subsequently interpreted as an acceleration imparted upon MEMS transducer 1000 in the x-direction.

Figure 8E:
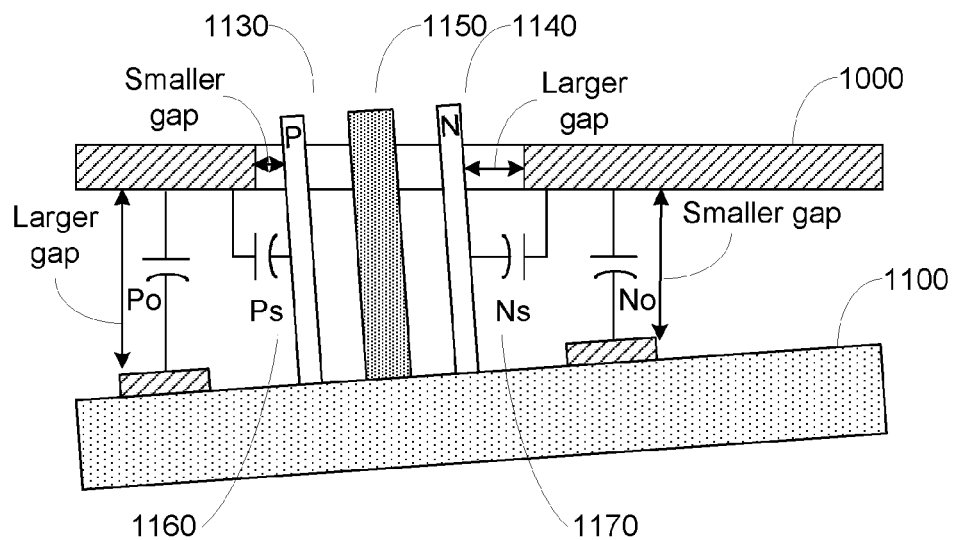

In another example, as illustrated in FIG. 8E, MEMS transducer 1000 remains stationary but changes orientation with regards to substrate 1100 in response to substrate 1100 bending or flexing in the z-direction. In this example, the values of capacitors 1110 and 1120 may vary (e.g. planar or interdigitated plates), and the capacitances of capacitors 1160 and 1170 also vary. In response, in this embodiment, the duty cycle or amplitude of input signal 1240 (e.g. 50%, 1 volt) is substantially unaffected. As a result, output signal 1250 will have a relatively constant duty cycle (e.g. 50%) or amplitude (e.g. 1 volt). The substantially constant duty cycle and/or amplitude is subsequently interpreted as the MEMS transducer 1000 as not being under acceleration in the x direction, for example.

Figure 9:
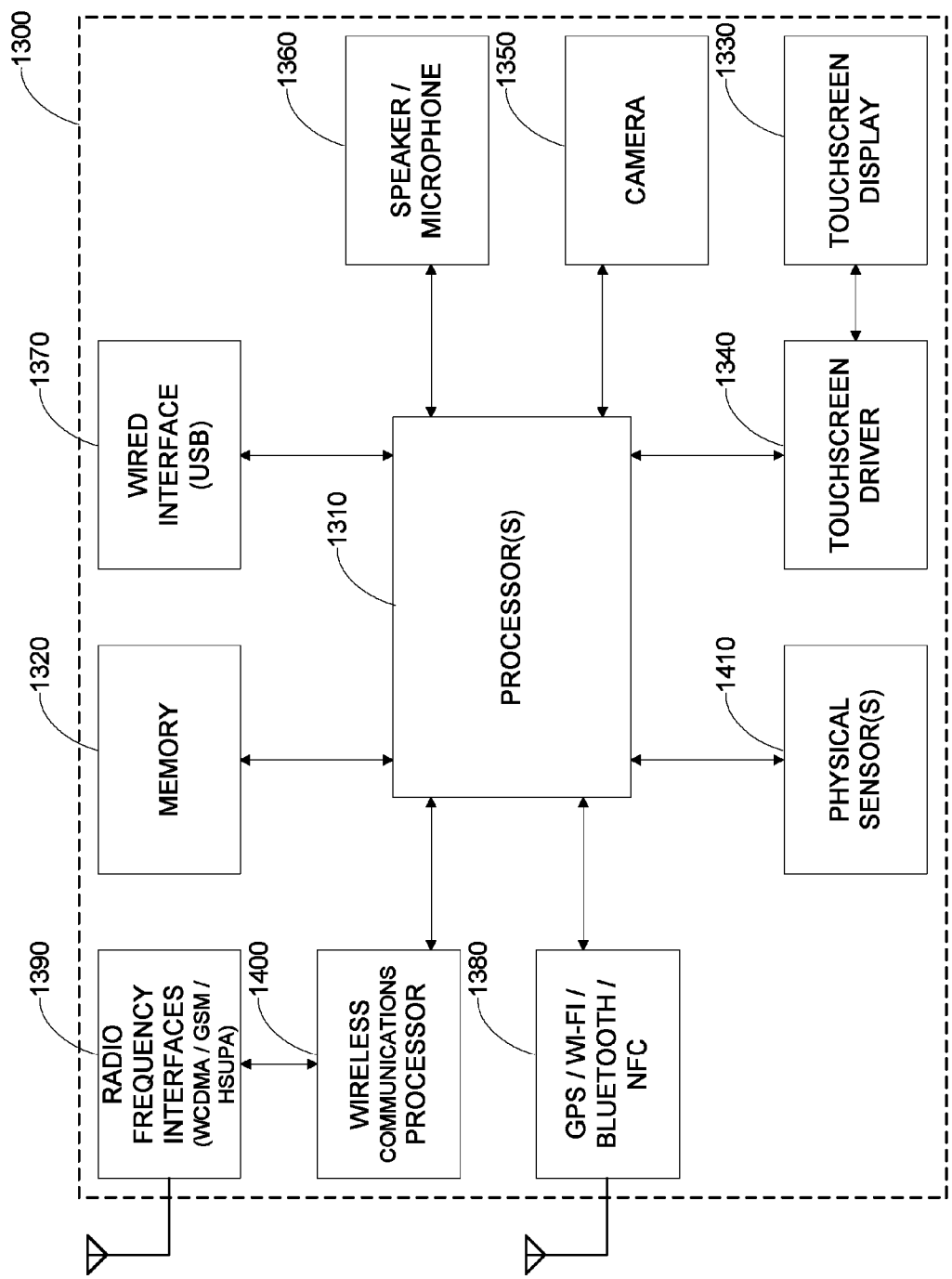
FIG. 9 illustrates a block diagram of additional embodiments of the present invention.

FIG. 9 illustrates a functional block diagram of various embodiments of the present invention. In FIG. 9, a computing device 1300 typically includes an applications processor 1310, memory 1320, a touch screen display 1330 and driver 1340, an image acquisition device 1350, audio input/output devices 1360, and the like. Additional communications from and to computing device are typically provided by via a wired interface 1370, a GPS/Wi-Fi/Bluetooth interface 1380, RF interfaces 1390 and driver 1400, and the like. Also included in various embodiments are physical sensors 1410.

In various embodiments, computing device 1300 may be a hand-held computing device (e.g. Apple iPad, Apple iTouch, Dell Mini slate, Lenovo Skylight/IdeaPad, Asus EEE series, Microsoft Courier, Samsung Galaxy Tab, Android Tablet), a portable telephone (e.g. Apple iPhone, Motorola Droid series, Google Nexus S, HTC Sensation, Samsung Galaxy S series, Palm Pre series, Nokia Lumina series), a portable computer (e.g. netbook, laptop, ultrabook), a media player (e.g. Microsoft Zune, Apple iPod), a reading device (e.g. Amazon Kindle Fire, Barnes and Noble Nook), or the like.

Typically, computing device 1300 may include one or more processors 1310. Such processors 1310 may also be termed application processors, and may include a processor core, a video/graphics core, and other cores. Processors 1310 may be a processor from Apple (A4/A5), Intel (Atom), NVidia (Tegra 2, 3), Marvell (Armada), Qualcomm (Snapdragon), Samsung, TI (OMAP), or the like. In various embodiments, the processor core may be an Intel processor, an ARM Holdings processor such as the Cortex-A, -M, -R or ARM series processors, or the like. Further, in various embodiments, the video/graphics core may be an Imagination Technologies processor PowerVR-SGX, -MBX, -VGX graphics, an Nvidia graphics processor (e.g. GeForce), or the like. Other processing capability may include audio processors, interface controllers, and the like. It is contemplated that other existing and/or later-developed processors may be used in various embodiments of the present invention.

In various embodiments, memory 1320 may include different types of memory (including memory controllers), such as flash memory (e.g. NOR, NAND), pseudo SRAM, DDR SDRAM, or the like. Memory 1320 may be fixed within computing device 1300 or removable (e.g. SD, SDHC, MMC, MINI SD, MICRO SD, CF, SIM). The above are examples of computer readable tangible media that may be used to store embodiments of the present invention, such as computer-executable software code (e.g. firmware, application programs), application data, operating system data or the like. It is contemplated that other existing and/or later-developed memory and memory technology may be used in various embodiments of the present invention.

In various embodiments, touch screen display 1330 and driver 1340 may be based upon a variety of later-developed or current touch screen technology including resistive displays, capacitive displays, optical sensor displays, electromagnetic resonance, or the like. Additionally, touch screen display 1330 may include single touch or multiple-touch sensing capability. Any later-developed or conventional output display technology may be used for the output display, such as TFT-LCD, OLED, Plasma, trans-reflective (Pixel Qi), electronic ink (e.g. electrophoretic, electrowetting, interferometric modulating). In various embodiments, the resolution of such displays and the resolution of such touch sensors may be set based upon engineering or non-engineering factors (e.g. sales, marketing). In some embodiments of the present invention, a display output port, such as an HDMI-based port or DVI-based port may also be included.

In some embodiments of the present invention, image capture device 1350 may include a sensor, driver, lens and the like. The sensor may be based upon any later-developed or convention sensor technology, such as CMOS, CCD, or the like. In various embodiments of the present invention, image recognition software programs are provided to process the image data. For example, such software may provide functionality such as: facial recognition, head tracking, camera parameter control, or the like.

In various embodiments, audio input/output 1360 may include conventional microphone(s)/speakers. In some embodiments of the present invention, three-wire or four-wire audio connector ports are included to enable the user to use an external audio device such as external speakers, headphones or combination headphone/microphones. In various embodiments, voice processing and/or recognition software may be provided to applications processor 1310 to enable the user to operate computing device 1300 by stating voice commands. Additionally, a speech engine may be provided in various embodiments to enable computing device 1300 to provide audio status messages, audio response messages, or the like.

In various embodiments, wired interface 1370 may be used to provide data transfers between computing device 1300 and an external source, such as a computer, a remote server, a storage network, another computing device 1300, or the like. Such data may include application data, operating system data, firmware, or the like. Embodiments may include any later-developed or conventional physical interface/protocol, such as: USB 2.0, 3.0, micro USB, mini USB, Firewire, Apple iPod connector, Ethernet, POTS, or the like. Additionally, software that enables communications over such networks is typically provided.

In various embodiments, a wireless interface 1380 may also be provided to provide wireless data transfers between computing device 1300 and external sources, such as computers, storage networks, headphones, microphones, cameras, or the like. As illustrated in FIG. 9, wireless protocols may include Wi-Fi (e.g. IEEE 802.11 a/b/g/n, WiMax), Bluetooth, IR, near field communication (NFC), ZigBee and the like.

GPS receiving capability may also be included in various embodiments of the present invention, however is not required. As illustrated in FIG. 9, GPS functionality is included as part of wireless interface 1380 merely for sake of convenience, although in implementation, such functionality is currently performed by circuitry that is distinct from the Wi-Fi circuitry and distinct from the Bluetooth circuitry.

Additional wireless communications may be provided via RF interfaces 1390 and drivers 1400 in various embodiments. In various embodiments, RF interfaces 1390 may support any future-developed or conventional radio frequency communications protocol, such as CDMA-based protocols (e.g. WCDMA), GSM-based protocols, HSUPA-based protocols, or the like. In the embodiments illustrated, driver 1400 is illustrated as being distinct from applications processor 1310. However, in some embodiments, these functionality are provided upon a single IC package, for example the Marvel PXA330 processor, and the like. It is contemplated that some embodiments of computing device 1300 need not include the RF functionality provided by RF interface 1390 and driver 1400.

FIG. 9 also illustrates computing device 1300 to include physical sensors 1410. In various embodiments of the present invention, physical sensors 1410 are multi-axis Micro-Electro-Mechanical Systems (MEMS) based devices being developed by M-cube, the assignee of the present patent application. Physical sensors 1410 developed by M-cube currently include very low power three-axis sensors (linear, gyro or magnetic); ultra-low jitter three-axis sensors (linear, gyro or magnetic); low cost six-axis motion sensor (combination of linear, gyro, and/or magnetic); ten-axis sensors (linear, gyro, magnetic, pressure); and various combinations thereof.

Various embodiments may include an accelerometer with a reduced substrate displacement bias, as described above. Accordingly, using such embodiments, computing device 1300 is expected to have a lower sensitivity to temperature variations, lower sensitivity to production/assembly forces imparted upon to an accelerometer, faster calibration times, lower production costs, and the like.

As described in the patent applications referenced above, various embodiments of physical sensors 1410 are manufactured using a foundry-compatible process. As explained in such applications, because the process for manufacturing such physical sensors can be performed on a standard CMOS fabrication facility, it is expected that there will be a broader adoption of such components into computing device 1300. In other embodiments of the present invention, conventional physical sensors 1410 from Bosch, STMicroelectrnics, Analog Devices, Kionix or the like may be used.

In various embodiments, any number of future developed or current operating systems may be supported, such as iPhone OS (e.g. iOS), WindowsMobile (e.g. 7, 8), Google Android (e.g. 3.x, 4.x), Symbian, or the like. In various embodiments of the present invention, the operating system may be a multi-threaded multi-tasking operating system. Accordingly, inputs and/or outputs from and to touch screen display 1330 and driver 1340 and inputs/or outputs to physical sensors 1410 may be processed in parallel processing threads. In other embodiments, such events or outputs may be processed serially, or the like. Inputs and outputs from other functional blocks may also be processed in parallel or serially, in other embodiments of the present invention, such as image acquisition device 1350 and physical sensors 1410.

FIG. 9 is representative of one computing device 1300 capable of embodying the present invention. It will be readily apparent to one of ordinary skill in the art that many other hardware and software configurations are suitable for use with the present invention. Embodiments of the present invention may include at least some but need not include all of the functional blocks illustrated in FIG. 9. For example, in various embodiments, computing device 1300 may lack image acquisition unit 1350, or RF interface 1390 and/or driver 1400, or GPS capability, or the like. Additional functions may also be added to various embodiments of computing device 1300, such as a physical keyboard, an additional image acquisition device, a trackball or trackpad, a joystick, or the like. Further, it should be understood that multiple functional blocks may be embodied into a single physical package or device, and various functional blocks may be divided and be performed among separate physical packages or devices.

Further embodiments can be envisioned to one of ordinary skill in the art after reading this disclosure. In other embodiments, combinations or sub-combinations of the above disclosed invention can be advantageously made. The block diagrams of the architecture and flow charts are grouped for ease of understanding. However it should be understood that combinations of blocks, additions of new blocks, re-arrangement of blocks, and the like are contemplated in alternative embodiments of the present invention.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method for providing acceleration data, with reduced substrate-displacement bias, from an accelerometer comprising a substrate, an asymmetrically weighted MEMS transducer disposed on the substrate, the MEMS transducer having a first transducer portion, a second transducer portion, and a transducer axis of rotation, wherein the first transducer portion is longer than the second transducer portion, at least one symmetrically weighted MEMS compensation structure disposed on the substrate, the MEMS compensation structure having a first compensation portion, a second compensation portion, and a compensation axis of rotation, wherein the first compensation portion and the second compensation portion are equal in length, wherein the MEMS compensation structure is configured such that the compensation axis of rotation is coincident with the transducer axis of rotation, and a compensation circuit disposed on the substrate, the compensation circuit being coupled to the MEMS transducer and the MEMS compensation structure, wherein the substrate is subject to a substrate displacement, the method comprising:

receiving in the accelerometer an external acceleration;

determining the acceleration data with reduced substrate displacement bias in the compensation circuit in response to a first displacement indicator and a second displacement indicator from the MEMS transducer and in response to substrate compensation factors from the MEMS compensation structure; and outputting the acceleration data with reduced substrate displacement bias from the compensation circuit;

wherein the first displacement indicator and the second displacement indicator are determined by the MEMS transducer relative to the substrate in response to the external acceleration and to the substrate displacement; and wherein the substrate compensation factors are determined by the MEMS compensation structure relative to the substrate in response to the substrate displacement.

2. The method of claim 1 wherein the substrate displacement is imparted by a factor selected from a group consisting of: a thermal stress, a packaging stress, and a mounting stress.

3. The method of claim 2 wherein the substrate displacement comprises a time-varying substrate displacement.

4. The method of claim 1
wherein the first displacement indicator is determined in response to a change in a first distance between the first portion of the MEMS transducer relative to the substrate; and
wherein the second displacement indicator is determined in response to a change in a second distance between the second portion of the MEMS transducer relative to the substrate.

5. The method of claim 1
wherein the first displacement indicator is determined in response to a change in a first capacitance between the first portion of the MEMS transducer relative to the substrate; and
wherein the second displacement indicator is determined in response to a change in a second capacitance between the second portion of the MEMS transducer relative to the substrate.

6. The method of claim 1
wherein the substrate compensation factors are determined in response to: a change in a first capacitance between the first portion of the MEMS compensation structure relative to the substrate, and to a change in a second capacitance between the second portion of the MEMS compensation structure relative to the substrate.

7. The method of claim 1
wherein the external acceleration comprises an normal acceleration component, wherein the normal acceleration component is normal to a surface of the substrate; and
wherein the first displacement indicator and the second displacement indicator are determined by the MEMS transducer relative to the substrate in response to the normal acceleration component and to the substrate displacement.

8. The method of claim 1
wherein the external acceleration comprises an planar acceleration component, wherein the planar acceleration component is parallel to a surface of the substrate; and
wherein the first displacement indicator and the second displacement indicator are determined by the MEMS transducer relative to the substrate in response to the planar acceleration component and to the substrate displacement.

9. The method of claim 1, wherein the acceleration data is determined free from a direct temperature measurement of the accelerometer.

10. The method of claim 1 further comprising:
determining an operating temperature of the accelerometer; and
wherein determining the acceleration data is also in response to the operating temperature.

11. An accelerometer disposed upon a substrate for outputting acceleration data with reduced substrate-displacement bias comprises:
a symmetrically weighted calibration sensor coupled to the substrate, the calibration sensor having a first calibration portion, a second calibration portion, and a calibration axis of rotation, wherein the first calibration portion and the second calibration portion are equal in length, wherein a substrate calibration displacement is determinable between the calibration sensor relative to the substrate in response to a substrate displacement;
an asymmetrically weighted MEMS transducer coupled to the substrate, the MEMS transducer having a first transducer portion, a second transducer portion, and a transducer axis of rotation, wherein the first transducer portion is longer than the second transducer portion, wherein the calibration sensor is configured such that the calibration axis of rotation is coincident with the transducer axis of rotation, wherein a first displacement and a second displacement are determinable between the first transducer portion and the second transducer portion of the MEMS transducer, respectively, relative to the substrate in response to the substrate displacement and to an external acceleration; and
a compensation circuit coupled to the substrate, to the calibration sensor, and to the MEMS transducer, wherein the compensation portion is configured to determine acceleration data with reduced substrate-displacement bias in response to the substrate calibration displacement, to the first displacement, and to the second displacement, and configured to output the acceleration data with reduced substrate displacement bias.

12. The accelerometer of claim 11
wherein the first displacement is associated with a first capacitance;
wherein the second displacement is associated with a second capacitance;
wherein the substrate calibration displacement is associated with at least a third capacitance.

13. The accelerometer of claim 11 wherein the compensation circuit comprises one or more amplifiers.

14. The accelerometer of claim 13
wherein the compensation portion is configured to determine the acceleration data with reduced substrate-displacement bias in response to an input signal having an input duty cycle; and
wherein the acceleration data with reduced substrate-displacement bias comprises an output signal having an output duty cycle.

15. The accelerometer of claim 14 wherein
wherein the acceleration data with reduced substrate-displacement bias is determined in response to the input duty cycle and the output duty cycle.

16. A method of forming a MEMS accelerometer comprises:
forming a first electrode, a second electrode, a third electrode and a fourth electrode upon a first substrate;
forming an asymmetrically weighted MEMS transducer upon a second substrate, wherein the MEMS transducer comprises a fifth electrode and a sixth electrode, wherein the MEMS transducer includes a first transducer portion, a second transducer portion, and an axis of rotation, wherein the first transducer portion is longer than the second transducer portion;
forming a symmetrically weighted substrate displacement sensor upon the second substrate, wherein the substrate displacement portion comprises a seventh electrode and an eighth electrode, wherein the substrate displacement sensor includes a first displacement portion and a second displacement portion that are equal in length, wherein the axis of rotation of the MEMS transducer is substantially similar to an axis of rotation of the substrate displacement sensor;
bonding the first substrate to the second substrate, wherein a first capacitor is formed between the first electrode and the fifth electrode, wherein a second capacitor is formed between the second electrode and the sixth electrode, wherein a third capacitor is formed between the third electrode and the seventh electrode, and wherein a fourth capacitor is formed between the fourth electrode and the seventh electrode;

forming a compensation circuit upon the substrate, wherein the compensation circuit is coupled to the first capacitor, the second capacitor, the third capacitor, and the fourth capacitor.

17. The method of claim 16 wherein the substrate displacement portion is within the MEMS transducer.

18. The method of claim 16
wherein the first electrode comprises a first vertical surface and the third electrode comprises a second vertical surface; and
wherein the first capacitor comprises the first vertical surface and the second vertical surface.

19. The method of claim 16
wherein the first electrode comprises a first horizontal surface and the third electrode comprises a second horizontal surface; and
wherein the first capacitor comprises the first horizontal surface and the second horizontal surface.

20. The method of claim 16 wherein forming the MEMS transducer upon the second substrate, comprises performing a reactive ion etch.

* * * * *